Patented Dec. 29, 1936

2,065,639

UNITED STATES PATENT OFFICE 2,065,639

AZO-DYESTUFFS

Gérald Bonhôte, Basel, and Carl Apotheker, Riehen, Switzerland, assignors to Society of Chemical Industry in Basle, Basel, Switzerland No Drawing. Application May 20, 1936, Serial No. 80,907. In Switzerland May 22, 1935

11 Claims. (Cl. 260—84)

According to this invention new azo-dyestuffs are obtained by combining with a coupling component, particularly with a coupling component which couples due to the presence of an OH-group, a diazotized amino-azo compound corresponding with the general formula—

$$R_1-N=N-R_2-N=N-OH$$

wherein $R_1$ and $R_2$ represent aromatic radicals selected from the group consisting of aromatic radicals of the benzene and naphthalene series and wherein there is present in ortho-position to the diazo-group a group OR, R representing an etherified hydroxy-alkyl radical.

In this manner there may be produced dyestuffs which correspond to the general formula—

$$R_1-N=N-R_2-N=N-R_3$$

wherein $R_1$ and $R_2$ stand for aromatic nuclei selected from the group of the aromatic nuclei of the benzene and naphthalene series, $R_3$ stands for the radical of a coupling component which couples due to the presence of an OH-group, and wherein the aromatic nucleus $R_2$ carries an $O-R_4$-group in ortho-position to the group $-N=N-R_3$, $R_4$ representing an etherified hydroxy-alkyl radical, which dyestuffs are useful for various purposes. If there are used sulfonate coupling components there are obtained dyestuffs which may be useful for dyeing wool or cotton. By using unsulfonated coupling components there are obtained insoluble dyestuffs which may be used as lakes or pigments or for other purposes. Among these insoluble dyestuffs those are of particular value which are obtained by combining a diazo-component of the foregoing formula with an arylide of an aromatic orthohydroxy-carboxylic acid which couples with diazo-compounds in ortho-position to the hydroxyl group. When produced on suitable substrata, for example on textile material, these dyestuffs yield inter alia orange, brown, Bordeaux to violet, blue and black tints which may be distinguished by excellent properties of fastness. There are also valuable dyestuffs obtained from other coupling components, such as those containing a methylene group capable of coupling.

Among the diazo-components which are especially suitable for use in the present invention there may be named quite generally the monoazo-dyestuffs which are obtainable by combining the diazo-compounds of aniline, the three toluidines, the xylidines, the three nitranilines, the substitution products of these diazo-components containing in the nucleus halogen or nitro-groups, α- and β-naphthylamine, the anisidines and phenetidines, such as ortho- or paraanisidine, or ortho- or paraphenetidine, substitution products of these diazo-components containing nuclear halogen or nitro-groups, 1-amino-2-methoxy-naphthalene and so on, with coupling components such as the ω-methoxyethyl ether of 2-amino-1-hydroxybenzene, the ω-ethoxyethyl ether of 2-amino-1-hydroxybenzene, the ω-methoxyethyl-ether of 2-amino-5-methyl-1-hydroxybenzene or of 2-amino-5-methoxy- or -5-ethoxy-1-hydroxybenzene, the ω-methoxybutylether of 2-amino-1-hydroxybenzene, the ω-methoxyethyl ether of 1-amino-2-hydroxynaphthalene and so on. Similar results are for example obtained with the ω-acetyl-hydroxy-ethyl ester of 2-amino-1-hydroxybenzene which has a similar constitution.

The present invention is however not limited to azo-dyestuffs containing ω-methoxyethyl and ω-ethoxyethyl groups. According to the present process there may also be produced such dyestuffs which contain instead of ω-methoxyethyl groups for example ω-ethoxybutyl, ω-ethoxypropyl, ω-ethoxyamyl groups, or the longer radical may be linked to that oxygen atom which is bound to the aromatic nucleus, in which case the dyestuffs of the present invention contain for example ω-amylhydroxyethyl groups.

With regard to the coupling components for making the dyestuffs in accordance with the present invention, it has already been pointed out that above all such components may be used successfully which due to the presence of an OH-group are capable of coupling. This expression comprises not only coupling components of the kind of the hydroxybenzenes, hydroxynaphthenes, hydroxyanthracenes and the like, but also the coupling components containing the $-CH_2-CO-$groups, such as pyrazolones and derivatives of the acetoacetic esters, such as acetoacetic anilide and the like, which, as is known, react with diazo compounds for the reason because the CO-group is capable of being converted into the enol form, that is to say the group $CH_2-C=O$ reacts as $$\underset{\mathrm{CH}=\overset{|}{\mathrm{C}}\text{-group}}{\mathrm{OH}}$$

As coupling components there may thus be named the various hydroxynaphthalenes and aminohydroxynaphthalenes and their sulfonic acids, as well as N-acyl derivatives of these substances, but principally, as already indicated, the arylides of ortho-hydroxycarboxylic acids which couple with diazo-compounds in ortho-position to the OH-group, such as the arylides of the paracresotin acid, the xylenol carboxylic acid $$OH \cdot COOH \cdot CH_3 \cdot CH_3 : 1:2:4:5$$

the chloro-cresotic acids $$OH \cdot COOH \cdot Cl \cdot CH_3 : 1:2:4:5$$

and 1:2:5:4, the 2,3-hydroxynaphthoic acid, the 6-bromo-2,3-hydroxynaphthoic acid, the 2,3-anthracene-hydroxycarboxylic acid, the 2,3-hydroxycarbazol-carboxylic acid, the benzo-2-hydroxycarbazol-3-carboxylic acid and the like, wherein the arylide radical is represented by radicals of aromatic mono- and diamines, such as the radicals of aniline, the toluidines, the chlorotoluidines, meta-nitraniline, α- and β-naphthylamine, para-phenylenediamine, benzidine, tolidine, dianisidine and the like, there being used in the case of diamines preferably such arylides which contain twice the radical of the aromatic ortho-hydroxycarboxylic acid. Besides these coupling components, as indicated above, there may also be employed still other components, such as pyrazolone sulfonic acids and derivatives of aceto-acetic esters, such as di-(aceto-acetyl)-ortho:ortho'-tolidine, as well as terephthaloyl-bis-acetic acid anilide, benzoyl acetic acid, ortho-chloranilide, barbituric acid and so on.

Among the dyestuffs of the present invention those are particularly valuable which correspond with the general formula—

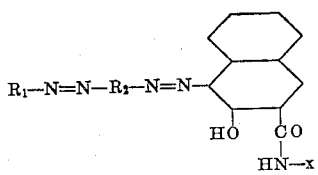

wherein $R_1$ and $R_2$ stand for aromatic nuclei of the benzene series which carry neither sulfogroups nor carboxylic groups, wherein the aromatic radical $R_2$ carries an $O—CH_2—CH_2—O—CH_3$-group in ortho-position to the radical—

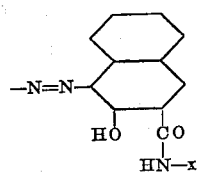

and wherein $x$ stands for an unsulfonated and non-carboxylated aromatic nucleus selected from the group consisting of the aromatic nuclei of the benzene and naphthalene series, which products are dark powders insoluble in water, but soluble in pyridine to wine-red solutions and in sulfuric acid to green solutions, and which when produced on vegetable fibers or viscose artificial silk, dye the same fast Bordeaux red and violet to black tints.

The following examples illustrate the invention:—

*Example 1*

27.1 parts by weight of 4-amino-3-(ω-methoxy)-ethoxy-1,1'-azobenzene are diazotized in the usual manner and introduced into a solution of 26.3 parts of 2,3-hydroxynaphthoic acid anilide, 50 parts of caustic soda solution of 30 per cent strength and 30 parts of anhydrous sodium carbonate in 2000 parts of water. The dyestuff of the formula—

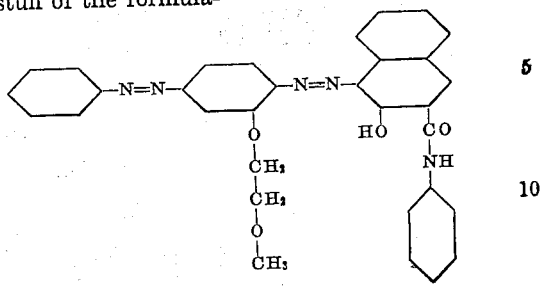

which is formed separates at once as a Bordeaux red precipitate which is filtered and dried. It dissolves in sulfuric acid to a green solution and in pyridine to a wine-red solution.

*Example 2*

Cotton yarn is impregnated with a solution containing per litre 3.5 grams of 2,3-hydroxynaphthoic acid-4'-chloranilide, 6 cc. of caustic soda solution of 34° Bé., 8 cc. of Turkey red oil and 4 cc. of a solution of formaldehyde of 40 per cent strength. After the material has been well wrung out it is introduced into a diazo-solution, neutralized with chalk, containing per litre the diazo-compound of 2 grams of 4-amino-3(ω - methoxy) ethoxy-1,1'-azobenzene and 10 grams of mono-sodium phosphate. There is obtained a pure garnet-red shade having very good fastness. The formula of the new dyestuff is—

The dyestuff if produced in substance dissolves in sulfuric acid to a green solution and in pyridine to a wine-red solution.

Similar shades are obtained, for example, if, as the coupling component, there is used the β-naphthalide or the 2-methoxyanilide of 2,3-hydroxy-naphthoic acid.

*Example 3*

Cotton yarn is impregnated with a grounding liquor prepared by dissolving 5 grams of 2,3-hydroxynaphthoic-acid-4'-methylanilide in 300 cc. of hot water with the addition of 10 cc. of sodium hydroxide solution and 10 cc. of Turkey red oil and diluting the whole to 1 litre. The material is then wrung out and the dyeing it developed in a diazo-solution neutralized with sodium acetate and containing the diazo-compound from 2 grams of 4-amino-3-(ω-methoxy)-ethoxy-1,1'-azobenzene per litre. There is obtained a pure currant tint of very good fastness. The formula of the new dyestuff is—

The dyestuff if produced in substance dissolves in sulfuric acid to a green solution and in pyridine to a wine-red solution.

Similar currant tints are obtained, for example, if 2,3-hydroxynaphthoic-acid-3'-nitranilide is used as coupling component.

Similar results are obtained in dyeing piece goods and in printing.

*Example 4*

30.75 parts of 4-amino-3-(ω-methoxy)-ethoxy-1,1'-azobenzene-chlorohydrate are introduced, while stirring, into a mixture of 30 parts of hydrochloric acid of 30 per cent. strength, 20 parts of water and 20 parts of ice and then the mixture is diazotized by introducing by drops a solution of 7.2 parts of sodium nitrite in 15 parts of water.

The diazo solution is allowed to run into a solution consisting of 34.8 parts of 2-hydroxynaphthalene-3,6-disulfonic acid, 348 parts of water and 21.2 parts of sodium carbonate.

A red-brown precipitate separates at once which is then filtered and dried. There is thus obtained a red-brown powder which dissolves in water and pyridine to wine-red solutions and in concentrated sulfuric acid to a blue solution. It dyes wool from an acid bath Bordeaux red tints. The dyestuff from 1-benzoylamino-8-hydroxynaphthalene-3,6-disulfonic acid dyes wool garnet red tints.

The following table displays further examples of products obtainable according to the process of the present invention:—

| | Diazotizing components | Coupling components | Color of the dyeing on cotton | Color in sulfuric acid | Color in pyridine |
|---|---|---|---|---|---|
| (1) | 4-amino-5-(ω-methoxy)-ethoxy-4'-nitro-1,1'-azobenzene. | 2,3-hydroxynaphthoic acid 4'-methylanilide. | Currant-violet | Green | Red-violet. |
| (2) | Do. | 4'-chloranilide | do | do | Do. |
| (3) | Do. | 1'-naphthylamide | do | do | Do. |
| (4) | Do. | 2'-naphthylamide | do | do | Do. |
| (5) | Do. | 4'-methoxyanilide | do | do | Do. |
| (6) | Do. | 4'-ethoxyanilide | do | do | Do. |
| (7) | Do. | 2',5'-dimethoxyanilide | do | do | Do. |
| (8) | Do. | 2',4'-dimethoxy-5'-chloroanilide | do | do | Do. |
| (9) | 4-amino-5-(ω-methoxy)-ethoxy-1,1'-azobenzene. | 4'-ethoxyanilide | Bordeaux | do | Wine-red. |
| (10) | Do. | 4'-methoxyanilide | Blue-Bordeaux | do | Do. |
| (11) | 4-amino-5-(ω-methoxy)-ethoxy-2-chloro-4'-nitro-1,1'-azobenzene. | 1'-naphthylamide | Currant-violet | do | Do. |
| (12) | Do. | 2'-naphthylamide | do | do | Red-violet. |
| (13) | Do. | 4'-methoxyanilide | do | do | Do. |
| (14) | Do. | 4'-ethoxyanilide | do | do | Do. |
| (15) | Do. | 2',5'-dimethoxyanilide | do | do | Do. |
| (16) | Do. | 3'-chloroanilide | do | do | Do. |
| (17) | 4-amino-5-(ω-methoxy)-ethoxy-2,4'-dichloro-1,1'-azobenzene. | 1'-naphthylamide | Garnet | do | Wine-red. |
| (18) | Do. | 4'-methoxyanilide | Blue-garnet | do | Do. |
| (19) | Do. | 4'-ethoxyanilide | Garnet | do | Do. |
| (20) | Do. | 2'-methyl-4'-methoxyanilide | do | do | Do. |
| (21) | 4-amino-5-ω-methoxy)-ethoxy-2-chloro-1,1'-azobenzene. | 2'-methyl-4'-chloroanilide | do | do | Do. |
| (22) | Do. | Anilide | do | do | Do. |
| (23) | Do. | 4'-chloroanilide | do | do | Do. |
| (24) | Do. | 1'-naphthylamide | do | do | Do. |
| (25) | Do. | 2'-naphthylamide | do | do | Do. |
| (26) | Do. | 4'-methoxyanilide | do | do | Do. |
| (27) | Do. | 2'-methoxyanilide | do | do | Do. |
| (28) | Do. | 4'-methylanilide | do | do | Do. |
| (29) | Do. | 4'-ethoxyanilide | do | do | Do. |
| (30) | 4-amino-5-(ω-methoxy)-ethoxy-4'-nitro-1,1'-azobenzene. | 4'-methoxyanilide | Currant-violet | do | Red-violet. |
| (31) | Do. | 4'-ethoxyanilide | do | do | Do. |
| (32) | Do. | 2',4'-dimethoxy-5'-chloroanilide | do | do | Do. |
| (33) | 4-amino-5-(ω-methoxy)-ethoxy-3'-chloro-1,1'-azobenzene. | 2',4'-dimethoxy-5'-chloroanilide | Bordeaux-garnet | do | Do. |
| (34) | Do. | 2'-methyl-4'-methoxyanilide | do | do | Do. |
| (35) | Do. | 4'-methoxyanilide | do | do | Wine-red. |
| (36) | Do. | 4'-ethoxyanilide | do | do | Do. |
| (37) | 4-amino-5-(ω-ethoxy)-ethoxy-3'-chloro-1,1'-azobenzene. | 4'-chloroanilide | do | do | Do. |
| (38) | Do. | 1'-naphthylamide | Garnet | do | Do. |
| (39) | Do. | 4'-methoxyanilide | Bordeaux-garnet | do | Do. |
| (40) | Do. | 4'-methylanilide | do | do | Do. |
| (41) | 4-amino-5-(ω-ethoxy)-ethoxy-4'-chloro-1,1'-azobenzene. | 1'-naphthylamide | Garnet | do | Do. |
| (42) | Do. | 2'-naphthylamide | do | do | Do. |
| (43) | Do. | 4'-methoxyanilide | Bordeaux-garnet | do | Do. |
| (44) | Do. | 2'-methoxyanilide | do | do | Do. |
| (45) | Do. | 4'-methoxyanilide | do | do | Do. |
| (46) | Do. | 4'-ethoxyanilide | do | do | Do. |
| (47) | Do. | 7,8-benzocarbazole-3'-hydroxy-2'-carbonyl-p-anisidide. | Black | Blue-violet | Blue. |
| (48) | 4-amino-5-(ω-methoxy)-ethoxy-2-chloro-1,1'-azobenzene. | 7,8-benzocarbazole-3'-hydroxy-2-methyl-p-methoxyanilide. | do | Blue | Do. |
| (49) | 4-amino-5-(ω-methoxy)-ethoxy-2-chloro-1,1'-azobenzene. | di-(acetylaceto)-o,o'-tolidine | Gold-orange | Wine-red | Yellow. |
| (50) | Do. | 2-hydroxycarbazole-3-carboxylic acid-4'-chloranilide. | Dark brown | Green with blue tinge. | Wine-red. |
| (51) | Do. | 7,8-benzocarbazole-3'-hydroxy-2'-carbonyl-p-methoxyanilide. | Black | do | Blue. |
| (52) | 4-amino-5-(ω-methoxy)-ethoxy-2-chloro-4'-nitro-1,1'-azobenzene | 7,8-benzocarbazole-3'-hydroxy-2-methyl-p-methoxyanilide. | do | do | Do. |
| (53) | Do. | di-(1-hydroxy-4-methyl-2-benzoyl) benzidine. | Brown | do | Reddish-brown. |
| (54) | Do. | di-(1-hydroxy-4-methyl-2-benzoyl) dianisidine. | do | do | Brown with red tinge. |
| (55) | Do. | di-(1-hydroxy-4-methyl-2-benzoyl) tolidine. | Dark brown | do | Do. |
| (56) | Do. | di-(acetylaceto)-o,o'-tolidine | Orange-brown | Blue with violet tinge. | Orange. |
| (57) | Do. | 2,3-hydroxycarbazole-carboxylic acid-4'-chloranilide. | Brown | Blue with green tinge. | Wine-red. |
| (58) | Do. | 7,8-benzocarbazole-3'-hydroxy-2'-carbonyl-p-methoxyanilide. | Black | do | Greenish. |
| | | 7,8-benzocarbazole-3'-hydroxy-2-methyl-p-methoxyanilide. | do | Blue | Do. |

| Diazotizing components | Coupling components | Color of the dyeing on cotton | Color in sulfuric acid | Color in pyridine |
|---|---|---|---|---|
| (59) 4-amino-5-(ω-methoxy)-ethoxy-1,1'-azo-benzene. | di-(acetylaceto)-o, o'-tolidine | Gold-orange | Wine-red | Yellow. |
| (60) Do | 2,3-hydroxycarbazole carboxylic acid-4'-chloroanilide. | Dark brown | Green with blue tinge. | Wine-red. |
| (61) 4-amino-5-(ω-methoxy)-ethoxy-2-chloro-benzene-1-azo-1'-naphthalene. | 2,3-hydroxy-naphthoic acid-anilide. | Garnet | Green-blue | Bordeaux. |
| (62) Do | 1'-naphthylamide | do | do | Do. |
| (63) Do | 2'-anisidide | Bordeaux-red | do | Do. |
| (64) Do | 4'-anisidide | Garnet | do | Do. |
| (65) 4-amino-5-(ω-methoxy)-ethoxy-benzene-1-azo-2-naphthalene. | Anilide | Bordeaux-red | Violet | Do. |
| (66) Do | 1'-naphthylamide | do | do | Do. |
| (67) Do | 2'-anisidide | do | do | Do. |
| (68) Do | 4'-anisidide | do | do | Do. |

The dyestuffs 10, 11, 17, 37, 46, 55, 61 and 66 correspond with the following formulae:—

No. 10

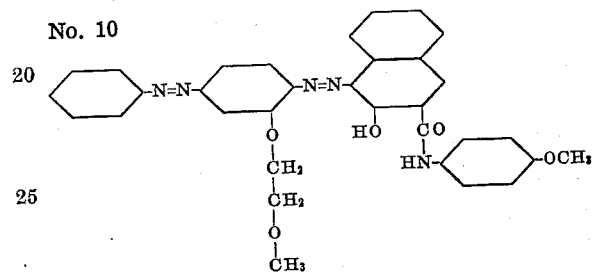

No. 55

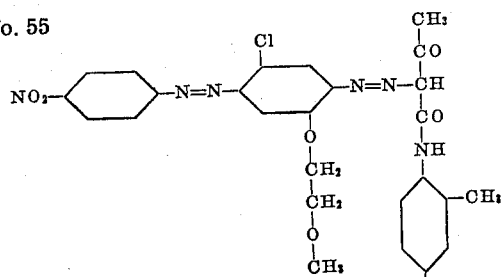

No. 11

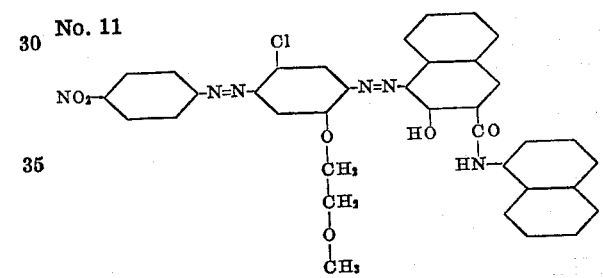

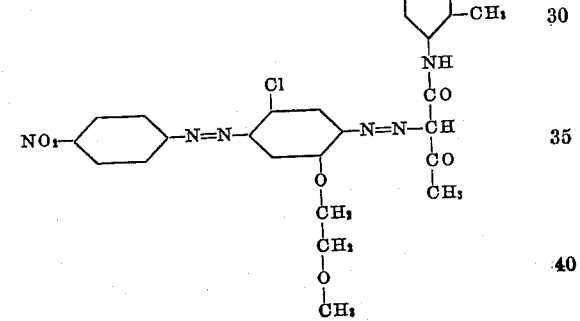

No. 17

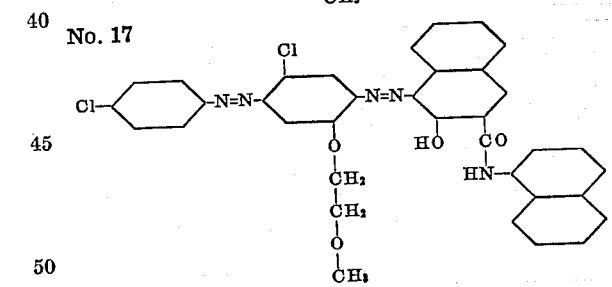

No. 61

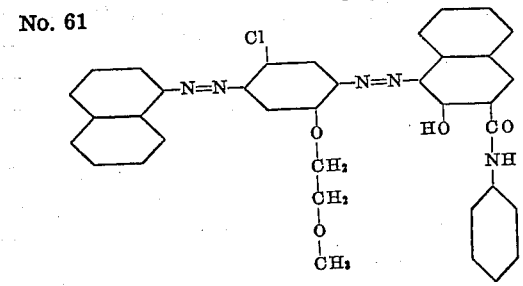

No. 37

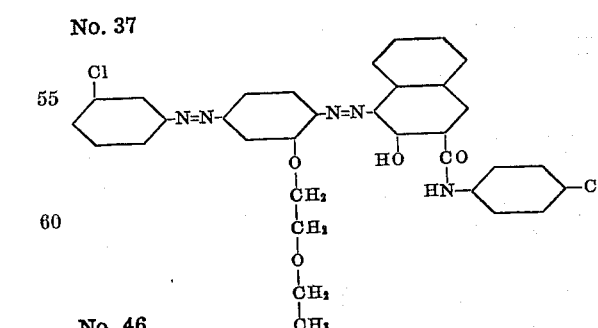

No. 66

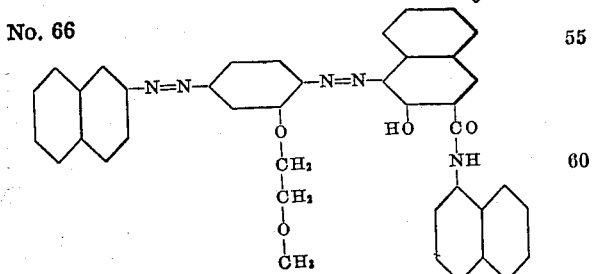

No. 46

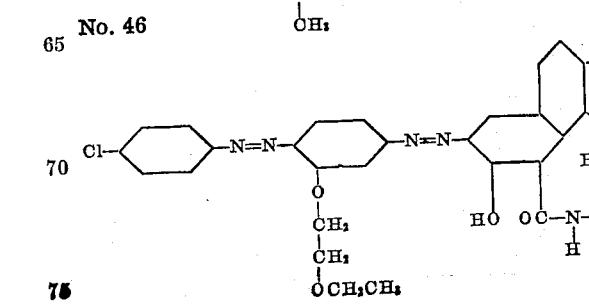

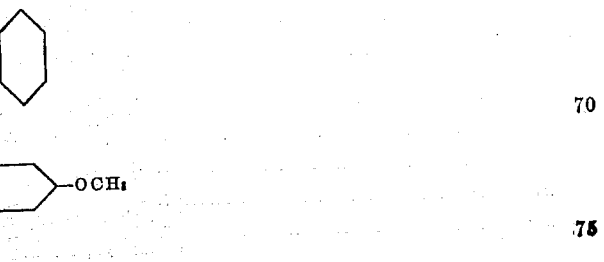

What we claim is:—
1. The dyestuffs of the general formula—

wherein $R_1$ and $R_2$ stand for aromatic nuclei selected from the group of the aromatic nuclei of the benzene and naphthalene series, $R_3$ stands for the radical of a coupling component which couples due to the presence of an OH-group, and wherein the aromatic nucleus $R_2$ carries an O—$R_4$-group in ortho-position to the group —N=N—$R_3$, $R_4$ representing an etherified hydroxy-alkyl radical, which products are dark powders dissolving in sulfuric acid to yellow to red, to violet and green solutions, and in pyridine to yellow to red, to violet and blue solutions, which dyestuffs when produced on the fiber dye the same fast orange to brown, to garnet, to violet and black tints.

2. The dyestuffs of the general formula—

wherein $R_1$ and $R_2$ stand for aromatic nuclei selected from the group of the aromatic nuclei of the benzene and naphthalene series, $R_3$ stands for the radical of an arylide of an ortho-hydroxycarboxylic acid selected from the group consisting of the ortho-hydroxycarboxylic acids of the benzene and naphthalene series which couples with diazo compounds in ortho-position to the OH-group, and wherein the aromatic nucleus $R_2$ carries an O—$R_4$-group in ortho-position to the group —N=N—$R_3$, $R_4$ representing an etherified hydroxy-alkyl radical, which products do not contain substituents of the group consisting of sulfo and carboxylic groups and are dark powders insoluble in water, but dissolving in sulfuric acid to yellow to red, to violet and green solutions, and in pyridine to yellow to red, to violet and blue solutions, which dyestuffs when produced on cotton dye the same fast orange to brown to garnet to violet and black tints.

3. The dyestffs of the general formula—

wherein $R_1$ and $R_2$ stand for aromatic nuclei selected from the group of the aromatic nuclei of the benzene and naphthalene series, $R_3$ stands for the radical of an arylide of the 2,3-hydroxynaphthoic acid, and wherein the aromatic nucleus $R_2$ carries an O—$R_4$-group in ortho-position to the group —N=N—$R_3$, $R_4$ representing an etherified hydroxy-alkyl radical, which products do not contain substituents of the group consisting of sulfo and carboxylic groups and are dark powders insoluble in water, but dissolving in sulfuric acid to green solutions, and in pyridine to wine-red to red-violet solutions, which dyestuffs when produced on cotton dye the same fast garnet to currant-violet tints.

4. The dyestuffs of the general formula—

wherein $R_1$ and $R_2$ stand for aromatic nuclei of the benzene series, $R_3$ stands for the radical of an arylide of the 2,3-hydroxynaphthoic acid, and wherein the aromatic nucleus $R_2$ carries an O—$R_4$-group in ortho-position to the group —N=N—$R_3$, $R_4$ representing an etherified hydroxy-alkyl radical, which products do not contain substituents of the group consisting of sulfo and carboxylic groups and are dark powders insoluble in water, but dissolving in sulfuric acid to green solutions, and in pyridine to wine-red to red-violet solutions, which dyestuffs when produced on cotton dye the same fast garnet to currant-violet tints.

5. The dyestuffs of the general formula—

wherein $R_1$ and $R_2$ stand for aromatic nuclei of the benzene series, $R_3$ stands for the radical of an arylide of the 2,3-hydroxynaphthoic acid, and wherein the aromatic nucleus $R_2$ carries a $CH_2CH_2OCH_3$-group in ortho-position to the group —N=N—$R_3$, which products do not contain substituents of the group consisting of sulfo and carboxylic groups and are dark powders insoluble in water, but dissolving in sulfuric acid to green solutions, and in pyridine to wine-red to red-violet solutions, which dyestuffs when produced on cotton dye the same fast garnet to currant-violet tints.

6. The dyestuffs of the general formula—

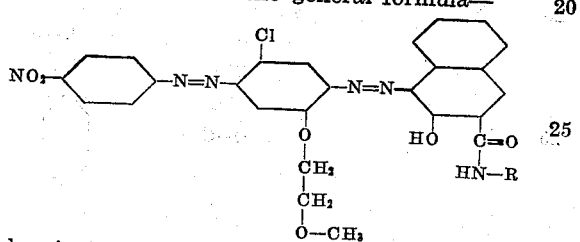

wherein R stands for an aryl nucleus selected from the group consisting of aryl nuclei of the benzene and naphthalene series, which products are dark powders insoluble in water, but dissolving in sulfuric acid to green solutions and in pyridine to wine-red solutions, which dyestuffs when produced on the vegetable fiber dye the same fast currant-violet tints.

7. The dyestuffs of the general formula—

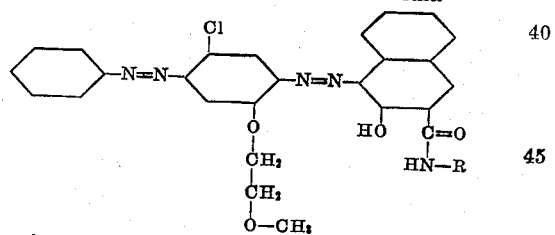

wherein R stands for an aryl nucleus selected from the group consisting of aryl nuclei of the benzene and naphthalene series, which products are dark powders insoluble in water, but dissolving in sulfuric acid to green solutions and in pyridine to wine-red solutions, which dyestuffs when produced on the vegetable fiber dye the same fast Bordeaux tints.

8. The dyestuffs of the general formula—

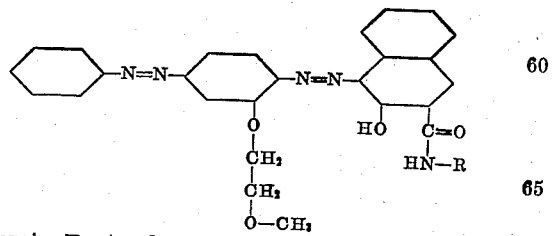

wherein R stands for an aryl nucleus selected from the group consisting of aryl nuclei of the benzene and naphthalene series, which products are dark powders insoluble in water, but dissolving in sulfuric acid to green solution and in pyridine to wine-red solutions, which dyestuffs when produced on the vegetable fiber dye the same fast Bordeaux tints.

9. The azo-dyestuff of the formula—

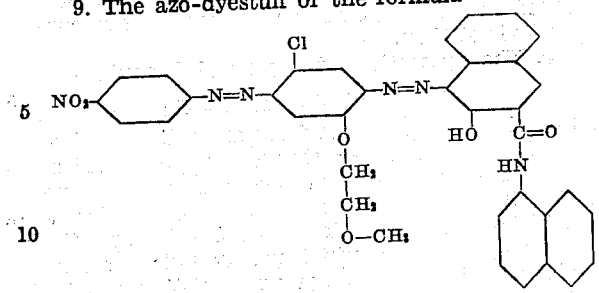

which dyestuff when produced on the vegetable fiber dyes the same fast currant-violet tints.

10. The azo-dyestuff of the formula—

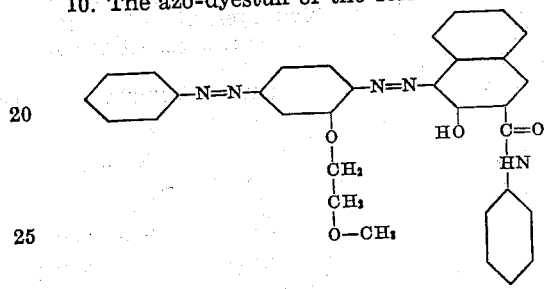

which dyestuff when produced on the vegetable fiber dyes the same fast Bordeaux tints.

11. The azo-dyestuff of the formula—

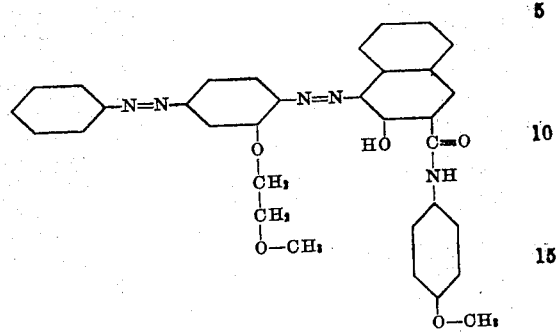

which dyestuff when produced on the vegetable fiber dyes the same fast currant-violet tints.

GÉRALD BONHÔTE.
CARL APOTHEKER.